United States Patent
Kumar et al.

(10) Patent No.: US 8,450,980 B2
(45) Date of Patent: May 28, 2013

(54) PROVIDING RESILIENT POWER TO A SYSTEM

(75) Inventors: Pavan M. Kumar, Portland, OR (US); Donald R. Alexander, Beaverton, OR (US); Robert A. Dunstan, Forest Grove, OR (US)

(73) Assignee: Intel Corporation, Santa Clara, CA (US)

(*) Notice: Subject to any disclaimer, the term of this patent is extended or adjusted under 35 U.S.C. 154(b) by 1247 days.

(21) Appl. No.: 10/879,612

(22) Filed: Jun. 29, 2004

(65) Prior Publication Data
US 2005/0285570 A1    Dec. 29, 2005

(51) Int. Cl.
*H02J 7/00* (2006.01)
(52) U.S. Cl.
USPC ............. 320/138; 320/103; 307/64; 307/66
(58) Field of Classification Search
USPC ............. 320/103, 112, 116, 124, 128, 138, 320/160; 307/64, 66
See application file for complete search history.

(56) References Cited

U.S. PATENT DOCUMENTS

| | | | | |
|---|---|---|---|---|
| 4,860,185 A | * | 8/1989 | Brewer et al. | 307/66 |
| 5,210,703 A | * | 5/1993 | Hodgson | 398/33 |
| 5,343,136 A | * | 8/1994 | Yamaguchi et al. | 320/103 |
| 5,481,175 A | * | 1/1996 | Qualich et al. | 320/103 |
| 5,485,922 A | * | 1/1996 | Butcher | 206/576 |
| 5,568,038 A | * | 10/1996 | Tatsumi | 320/103 |
| 5,777,454 A | * | 7/1998 | McAndrews et al. | 307/66 |
| 5,958,054 A | * | 9/1999 | O'Connor et al. | 713/300 |
| 6,201,371 B1 | * | 3/2001 | Kawabe et al. | 320/121 |
| 6,204,574 B1 | * | 3/2001 | Chi | 307/66 |
| 6,212,645 B1 | | 4/2001 | Tjandrasuwita | 713/330 |
| 6,225,708 B1 | * | 5/2001 | Furukawa et al. | 307/66 |
| 6,236,226 B1 | * | 5/2001 | Hagiwara | 324/771 |
| 6,255,744 B1 | * | 7/2001 | Shih et al. | 307/66 |
| 6,278,279 B1 | * | 8/2001 | Daun-Lindberg et al. | 324/427 |
| 6,373,222 B2 | * | 4/2002 | Odaohhara | 320/116 |
| 6,683,438 B2 | * | 1/2004 | Park et al. | 320/108 |
| 7,053,502 B2 | * | 5/2006 | Aihara et al. | 307/66 |

FOREIGN PATENT DOCUMENTS
GB    2 262 170    6/1993
TW    484048 B    4/2002

OTHER PUBLICATIONS

Taiwanese Patent Office, Office Action dated Jun. 26, 2008, with English language translation, pp. 1-6 and 11.
Taiwan Intellectual Property Office, an English Translation of the Office Action dated Jul. 3, 2010 in related Taiwan Patent Application No. 94121023.
Taiwanese Intellectual Patent Office, Office Action Dated May 27, 2009, in a related patent application.

* cited by examiner

*Primary Examiner* — Samuel Berhanu
(74) *Attorney, Agent, or Firm* — Trop, Pruner & Hu, P.C.

(57) ABSTRACT

In one embodiment, the present invention includes a resilient power supply having a charger to charge a battery with a low voltage and to provide back-up battery power to a system; and a main power supply to provide a plurality of voltages for operation of the system. The resilient power supply may be used to discharge the battery into the main power supply upon loss of alternating current (AC) power in the system.

15 Claims, 2 Drawing Sheets

PROVIDING RESILIENT POWER TO A SYSTEM

BACKGROUND

Resilient Power Supplies (RPSs) provide back-up electrical power in systems such as Personal Computers (PCs), enabling orderly shutdown during an Alternating Current (AC) power outage. There are many ways of providing resiliency. The common methods are to attach an Uninterruptible Power Supply (UPS) to the AC input of the PC power supply or to tap the high voltage point of the PC power supply to charge and discharge a battery. However, these methods are bulky and expensive.

For example, a UPS can be bulky, depending on the total power requirements and the length of back-up time required by the load, and adds additional cost and complexity to a system. Further, signaling between a UPS and a PC requires use of an externally exposed interface such as a Universal Serial Bus (USB) in accordance with the USB Specification Rev. 2.0 (published December 2000) or an industry standard (e.g., RS-232) interface. Use of these interfaces allows control when system software is operating, but the interfaces are inoperative when the system is suspended, making coordination between an operating system (OS) running on the system and the UPS problematic.

A typical RPS architecture includes an internal power supply with a high-voltage mid-point to both charge and discharge an associated Safe Extra Low Voltage (SELV) battery (e.g., corresponding to an International Electrotechnical Commission (IEC) standard). Such a high-voltage tap architecture for both charging/discharging the battery has the disadvantage of requiring electrical isolation between the high-potential end and battery portions of the circuit, due to safety considerations. Thus transformers are used for the charging portion of the RPS, making it bigger in size, heavier and also more expensive.

A need thus exists to provide resilient power to a system that overcomes these problems.

DETAILED DESCRIPTION

Figure 1:
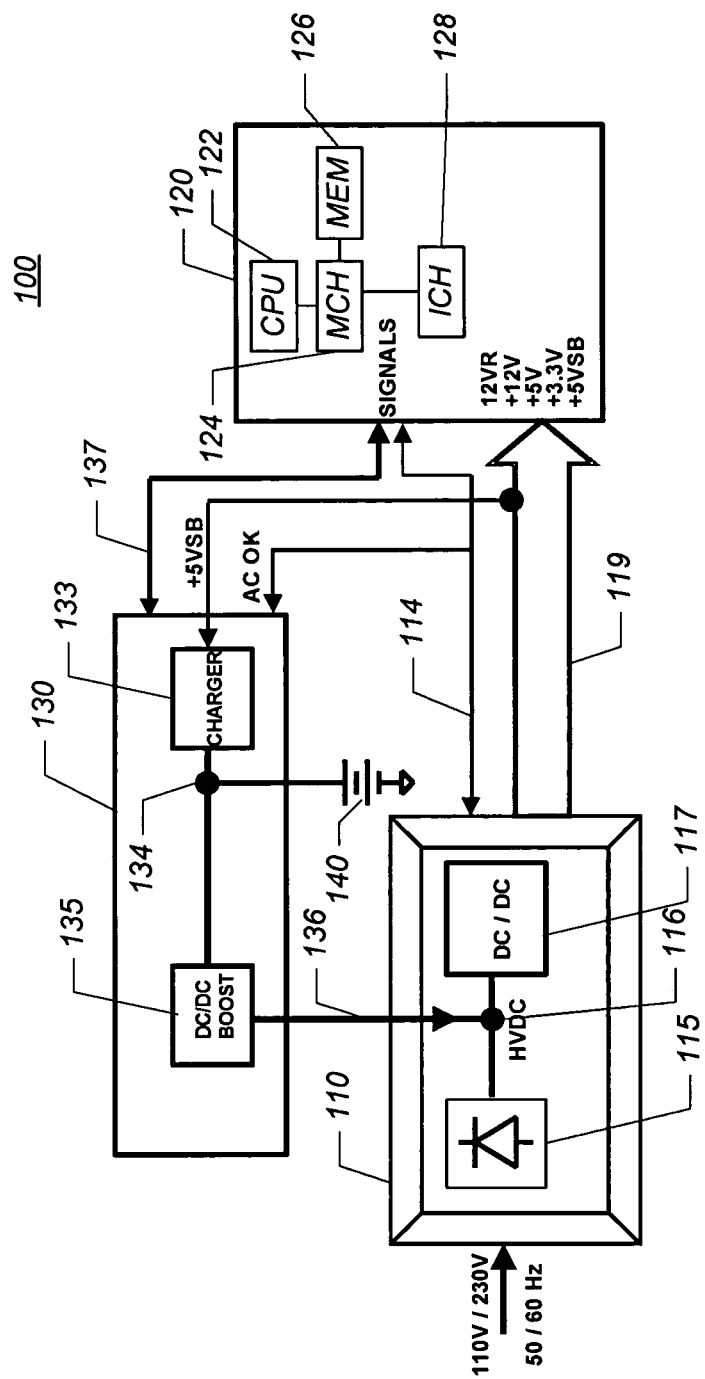
FIG. 1 is a block diagram of a system in accordance with one embodiment of the present invention.

Referring to FIG. 1, shown is a block diagram of a system in accordance with one embodiment of the present invention. As shown in FIG. 1, system 100 may be any type of information handling system, such as a desktop computer, notebook computer, server computer, or the like.

As shown in FIG. 1, system 100 receives AC power, for example, from an AC main source such as a wall socket or other power source at the input of a power supply 110. For example, such AC power is typically provided at 110 volts or 230 volts and at either 50 or 60 Hertz (Hz), depending on a given power system. Power supply 110 may be any type of power supply that receives AC inputs and provides one or more Direct Current (DC) outputs therefrom. In certain embodiments, power supply 110 may be an Advanced Technology Extension (ATX) power supply in accordance with the ATX Specification Ver. 2.2 (published 2003), a Balanced Technology Extension (BTX) power supply in accordance with the BTX Interface Specification Ver. 1.0 (published September 2003) or the like.

Shown for purposes of simplicity in FIG. 1, power supply 110 includes a rectifier/power factor correction (PFC) circuit 115 (hereafter "rectifier" 115) that rectifies the incoming AC signal into a high voltage DC signal. While the high voltage may vary, in certain embodiments the high voltage signal may be generally in the range of 110 and 300 volts, although the scope of the present invention is not so limited. The high voltage DC output from rectifier 115 may be provided to a voltage converter 117. More specifically, voltage converter 117 may be a step-down converter such as a DC/DC buck, forward or a fly-back converter to convert the high voltage DC signal into one or more lower DC voltage signals. Thus the output of power supply 110 may be a plurality of low voltage outputs 119. As used herein the term "low voltage" means a voltage of less than approximately 30 volts. As shown in FIG. 1, in certain embodiments, status and control signals 114 may be coupled between power supply 110 and circuit board 120. Such signals may include power supply on/off controls, fan speed control, and the like, for example.

As shown in FIG. 1, one or more low voltage outputs 119 may be provided to a circuit board 120 of system 100. In the embodiment of FIG. 1, power supply 110 may supply circuit board 120 with the following voltages: a 12 volt (V) regulated voltage; +12 V; +5 V; +3.3 V; and a +5 V standby (SB) signal. However, it is to be understood that the scope of the present invention is not limited to these specific voltages. As will be discussed further below, in the embodiment of FIG. 1, the +5V SB output may also be provided to a Resilient Power Supply (RPS) 130.

Circuit board 120 may be the main motherboard of system 100, for example, a desktop motherboard. Shown for purposes of simplicity in FIG. 1, circuit board 120 may include various components connected thereon, including a central processing unit (CPU) 122, a memory controller hub (MCH) 124, a memory 126, and an input/output hub (ICH) 128. While shown with these components in FIG. 1, it is to be understood that a motherboard may include additional and/or different components.

RPS 130 may be used to provide a source of resilient power in the case of a loss of AC power, for example, due to a power failure or other unexpected event (e.g., a user unplugs the system). As shown in FIG. 1, RPS 130 may include a battery charger 133, to which a battery 140 may be coupled via a node 134. In various embodiments, battery 140 may be any desired voltage in the range of 1.2 volts and 24.6 volts, depending on the number and type of cells that are combined to form the battery and the rated voltage of each such cell. In some embodiments, battery 140 may be housed within RPS 130, while in other embodiments, such as shown in FIG. 1, battery 140 may be external to RPS 130. Further, in some embodiments RPS 130 and power supply 110 may be in the same housing. Battery 140 may be a back-up battery used to provide a back-up source of power on loss of AC power.

A voltage converter 135 may be coupled to charger 133 and battery 140 at node 134. Voltage converter 135 may be a DC/DC boost converter, a buck/boost converter, a flyback or other such converter to convert a low voltage DC input into a high voltage DC output that is provided to power supply 110 via line 136. In certain embodiments, voltage converter 135 may provide a high voltage between approximately 250 to 300 volts, which may be provided to a high voltage tap node 116 between rectifier 115 and voltage converter 117 of power supply 110.

As shown in FIG. 1, RPS 130 receives a standby voltage, specifically the +5V SB voltage that is used by charger 133 to charge battery 140. While shown in the embodiment of FIG. 1 as being a +5V SB voltage, it is to be understood that in other embodiments, other low voltage signals including other standby voltages from power supply 110 may be used to charge battery 140.

In a system (e.g., a PC) with standby capability, the +5V SB rail may always be present when the AC mains are attached and active. In such manner, RPS 130 may charge battery 140 as long the AC mains are active. In other embodiments, other DC output voltages may be used. In still other embodiments, such low voltages may not be standby voltages or may be used in combination with a standby voltage.

For example, in certain embodiments, when AC mains are active and power supply 110 is on, any desired output voltage from power supply 110 may be used for charging. For example, by using a +12V output of power supply 110 when it is on, charging time may be reduced. However, if power supply 110 is off, back-up battery 140 may be charged using the +5V SB output of power supply 110, as will be discussed further below. Thus in such embodiments, a combination of outputs (e.g., +12V and +5V SB outputs) may allow faster charging when the system is on and the +12V output is present, while a trickle or maintenance charge may be maintained when the system is off and the +5V SB output is present, to ensure that battery 140 is optimally charged at all times.

In various embodiments, the inputs to charger 133 and battery 140 may both be low voltages (e.g., safe extra low voltages (SELV)). Thus no isolation barrier, such as a transformer, is needed between the charger and battery. Accordingly, the charger circuitry may be simplified and implemented in a relatively inexpensive manner.

When the AC mains fail, charger 133 may discontinue operation and voltage converter 135 may take over to provide energy from battery 140 to the load (e.g., the PC). Appropriate signaling for the transition between operating modes may be provided either from power supply 110, RPS 130 or circuit board 120 via signals 137 or signals 114.

As shown in FIG. 1, various status and control signals 137 may be coupled between RPS 130 and circuit board 120. Such signals may be used to control voltages and operation of the supplies themselves. In certain embodiments, connecting signals between RPS 130 and circuit board 120 allows the system hardware/firmware to directly control RPS 130. Signals 137 may include but are not limited to, AC presence (e.g., an AC status signal), battery control and battery health signals. Circuit board 120 may use changes in the AC presence signal to implement various operations, such as to wake the system, to save its state, to resume operation or to change power consumption/performance. The battery control signal may be used to allow the platform to turn on/off RPS 130 after a prescribed time or in response to a specific event. RPS 130 may also be controlled to extend the life of the battery and maximize the available capacity. By directly coupling RPS 130 with the system, the RPS battery capacity may be closely matched to the actual platform power requirements.

In one embodiment, the AC status signal (i.e., AC OK, as shown in FIG. 1) may be sent by power supply 110 through RPS 130 as part of signals 137. In other embodiments, the AC status signal may be sent directly from power supply 110 to circuit board 120 via signals 114.

In various embodiments, different status and control signals may be sent between RPS 130 and circuit board 120. For example, in one embodiment, control signals may be sent from circuit board 120 to RPS 130 to control charging operations in RPS 130. Such signals may include control signals to start or stop charging and further to control charging rate. In certain embodiments, the charging time may be relatively long using a standby voltage, such as a +5V SB signal to charge the battery. In such manner, only a small percentage of the standby power may be used to provide a maintenance charge at milliampere (mA) levels.

While control and status signals may be sent and received from various locations on circuit board 120, in one embodiment, ICH 128 may be used to receive status signals from RPS 130 and provide control signals thereto. Such control signals may be various battery control signals in accordance with different power management protocols. For example, in one embodiment, status and control signals in accordance with an Advanced Configuration Power Interface (ACPI) protocol (e.g., ACPI Specification Rev. 2.0c (published Aug. 25, 2003)) may be sent.

Figure 2:
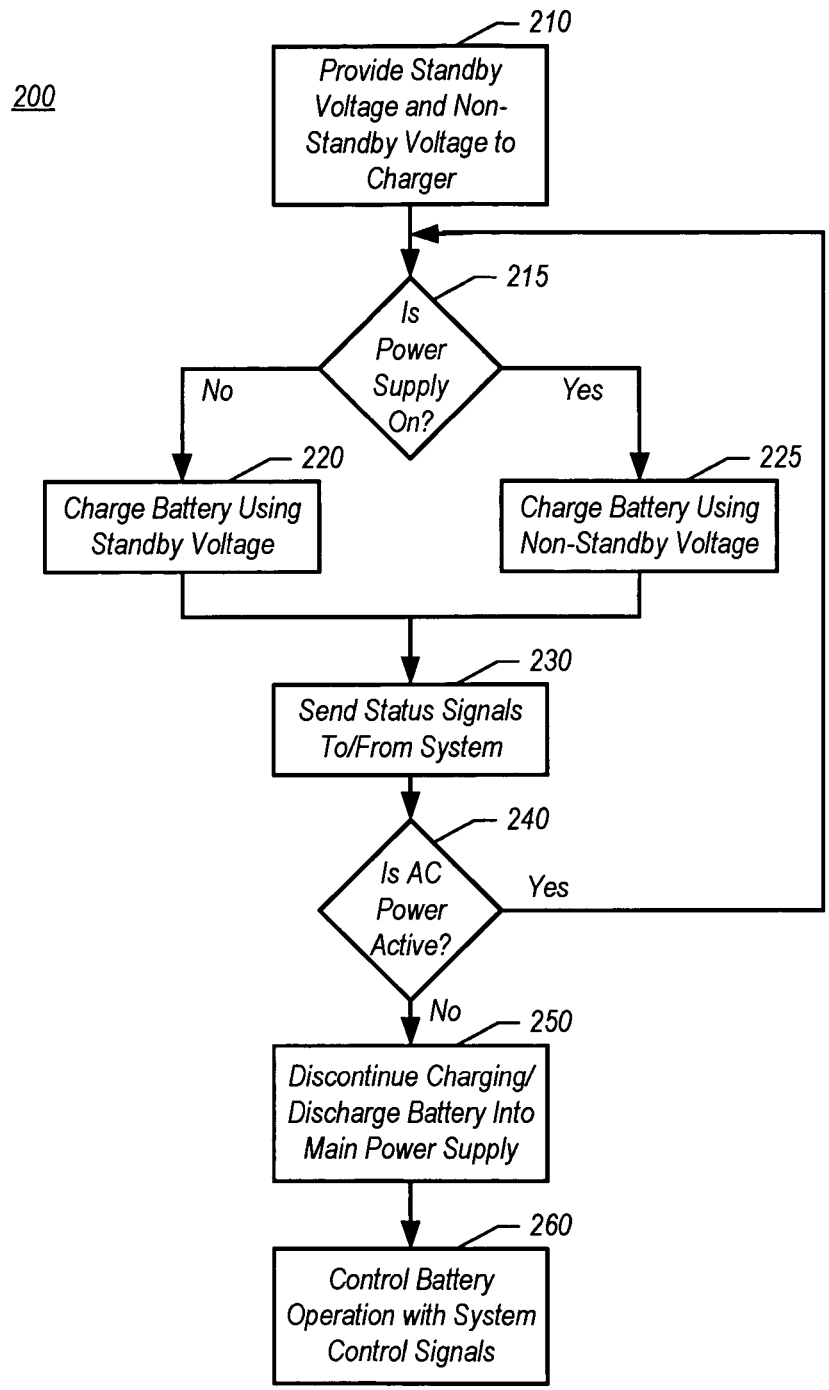
FIG. 2 is a flow diagram of a method in accordance with one embodiment of the present invention.

Referring now to FIG. 2, shown is a flow diagram of a method in accordance with one embodiment of the present invention. More specifically, method 200 may be used to charge a battery associated with an RPS and to provide control of charging and discharging thereof by a system.

As shown in FIG. 2, method 200 may begin by providing multiple voltages to a charger, which may be a charger within a RPS (block 210). For example, in one embodiment, a standby voltage (e.g., a +5V SB) and a non-standby voltage (e.g., +12V) may be provided. Then it may be determined whether a power supply is on (diamond 215). If the power supply is not on, a battery may be charged using the standby voltage (block 220). If instead, the power supply is on, the battery may be charged using the non-standby voltage (block 225). By using a non-standby voltage (and typically a higher such voltage) charging may occur faster. In certain embodiments, the battery may be housed within an RPS, while in other embodiments, the battery may be external to the RPS.

Then status signals may be sent to or from the system (block 230). For example, battery status and health signals may be sent to the system, while other status signals, such as an AC status signal may be sent to the RPS (e.g., from a power supply). Next it may be determined whether AC power is active (diamond 240). If AC power continues to be active, control may return to diamond 215 to check whether the power supply is on.

If instead at diamond 240 it is determined that AC power is no longer active, for example, due to power loss or the like, battery charging may be discontinued and instead the battery may be discharged to provide power to the main power supply (block 250). In various embodiments, the battery potential may be boosted to a high voltage DC signal for input into a DC/DC converter of the power supply.

Finally, control of battery operation may be effected using system control signals (block 260). For example, in an embodiment in which the battery is a back-up battery, control signals from the system may be used to cause the battery to shut down after various operations have been performed in the system. Such operations may include a graceful shutdown of the system in light of the loss of AC power. Alternately, based on battery status signals sent to the system, the system may allow for normal operation to continue: for some amount of time (e.g., approximately three minutes, in certain embodiments); until the battery reaches a certain state of discharge, at which time control signals may cause the system to initiate a graceful shutdown; or in another manner.

In various embodiments, system software may be provided to perform methods such as that described with respect to FIG. 2. Such embodiments may include an article in the form of a machine-accessible storage medium onto which there are stored instructions and data that form a software program to perform such methods of implementing an RPS. The program may be stored in memory 126 and executed using CPU 122, for example.

Thus in various embodiments, a smaller size RPS may be implemented, as electrical isolation between charger and battery is not needed. Such a reduced RPS enables smaller/compact system implementations and further may lower system cost. Additionally, in certain embodiments, charger efficiency may be improved, as a large voltage does not need to be converted to a small charging voltage via an electrical isolation barrier. Also, an RPS in accordance with an embodiment of the present invention may be more efficient than a UPS architecture, since multiple power conversion stages are eliminated.

Further, because an RPS may be better matched to a given system, battery capacity needed to preserve the system's data and state may be minimized, while providing maximum flexibility to respond to power events.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    charging a back-up battery using a standby low voltage from a standby rail of a main power supply of a system; and
    using the standby low voltage from the standby rail of the main power supply to charge the back-up battery when the main power supply and the system are off and alternating current (AC) mains are attached and active, and using a non-standby low voltage of the main power supply to charge the back-up battery when the main power supply and the system are on, wherein the system has standby capability.

2. The method of claim 1, wherein the standby low voltage is less than approximately 30 volts.

3. The method of claim 1, further comprising using a charger of a resilient power supply to charge the back-up battery.

4. The method of claim 3, further comprising sending an alternating current (AC) status signal from the main power supply to the resilient power supply.

5. The method of claim 4, further comprising forwarding the AC status signal to a circuit board of the system.

6. The method of claim 5, further comprising controlling operation of the back-up battery using software of the system based on the AC status signal.

7. The method of claim 1, further comprising discharging the back-up battery through a high voltage tap to the main power supply to power the system upon loss of alternating current (AC) power.

8. An apparatus comprising:
    a resilient power supply to provide back-up battery power to a system having standby capability, the resilient power supply having a charger to charge a battery with a first low voltage received from a standby rail of a main power supply, wherein the resilient power supply is to receive the first low voltage when the main power supply is off and alternating current (AC) mains are attached and active, otherwise the charger is to charge the battery with a second low voltage received from the main power supply when the main power supply is on, and wherein the main power supply is to provide a plurality of voltages for operation of the system.

9. The apparatus of claim 8, further comprising a circuit board coupled to receive the plurality of voltages.

10. The apparatus of claim 9, further comprising a status signal coupled between the resilient power supply and the circuit board.

11. The apparatus of claim 8, wherein the first low voltage comprises a standby voltage.

12. The apparatus of claim 8, wherein the battery is coupled to receive a low voltage charge signal from the charger.

13. An apparatus comprising:
    a first power supply to receive an incoming alternating current signal and having a first converter including a plurality of outputs to provide a plurality of low voltages to a circuit board of a system powered by the first power supply, the first power supply having a node coupled between a rectifier and the first converter, and the first power supply to couple a plurality of status and control signals between the first power supply and the circuit board; and
    a second power supply coupled to receive a first low voltage and a second low voltage of the plurality of low voltages from the first power supply, the second power supply including a charger to charge a battery and a second converter to receive a low voltage signal from the battery and provide a high voltage signal to the node of the first power supply, wherein the second power supply is to charge the battery with the first low voltage when the first power supply is on and to charge the battery with the second low voltage from a standby rail of the first power supply when the first power supply and the system are off and the alternating current signal is attached and active.

14. The apparatus of claim 13, wherein the first power supply comprises a main power supply and the second power supply comprises a resilient power supply.

15. The apparatus of claim 8, wherein the first low voltage and the second low voltage are less than approximately 30 volts.

* * * * *